Jan. 27, 1931.  P. MAIWURM  1,790,162
AIRCRAFT PROPULSION MEANS
Filed July 29, 1929   2 Sheets-Sheet 1

INVENTOR.
PAUL MAIWURM
BY
A. B. Bowman
ATTORNEY.

Jan. 27, 1931.   P. MAIWURM   1,790,162
AIRCRAFT PROPULSION MEANS
Filed July 29, 1929   2 Sheets-Sheet 2
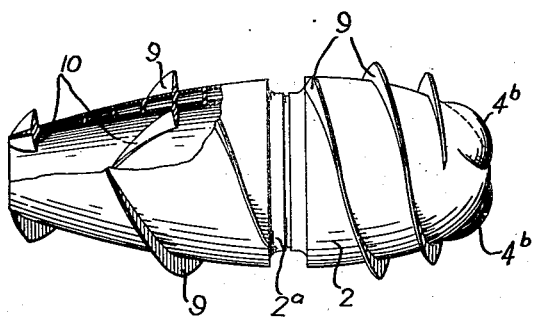
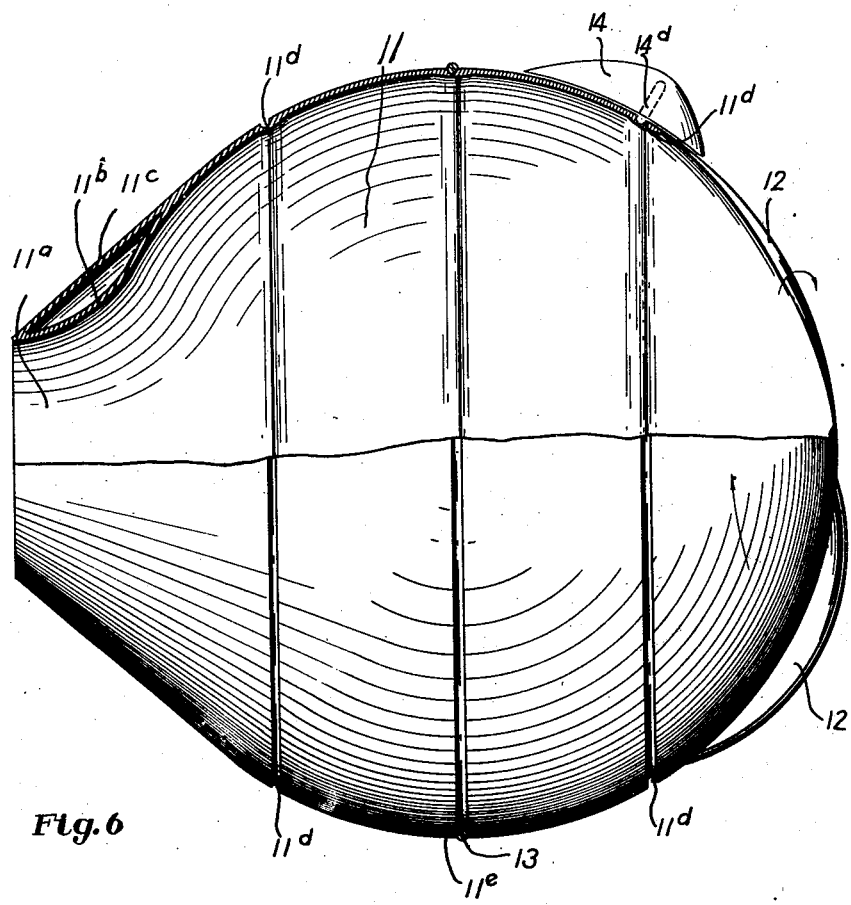
INVENTOR.
PAUL MAIWURM
BY
ATTORNEY Patented Jan. 27, 1931

1,790,162

UNITED STATES PATENT OFFICE

PAUL MAIWURM, OF SAN DIEGO, CALIFORNIA

AIRCRAFT PROPULSION MEANS

Application filed July 29, 1929. Serial No. 381,711.

My invention relates to aircraft propulsion means and the objects of my invention are: First, to provide a means of this class which draws in air at the forward end thereof and ejects it from the rear end thereof producing a rocket-like effect without the explosion of gases and the consequent loss of energy due to heat; second, to provide a propulsion means which may assist in sustaining as well as propelling an aircraft; third, to provide a propulsion means which may revolve at relatively low speeds as compared to the conventional airplane propeller; fourth, to provide an aircraft propulsion means which may be provided with fins on the outside, or the inside, or both sides, so as to increase its sustaining and propelling force; fifth, to provide an aircraft propulsion means in which suitable slits formed in the forward end thereof scoop the air into said propulsion means and cause air to pass out with a whirling motion which when striking the air passing over the outside surfaces of said propulsion means is immediately slowed down, creating a considerable excess pressure causing forward movement; sixth, to provide an aircraft propulsion means which is easily applicable to stream lining, thereby enabling the resistance thereof to be reduced to a minimum; seventh, to provide an aircraft propulsion means which is mounted so that it may be pivoted to a vertical or inclined position and enable the aircraft to which it is attached to take off without a running start; and eighth, to provide an aircraft propulsion means which is simple of construction proportional to its functions, durable, efficient in its action and which will not readily deteriorate or get out of order.

Figure 2:
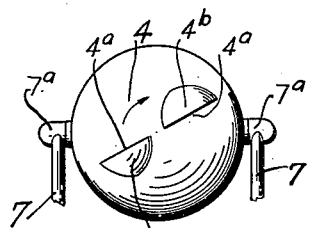
Figure 1:
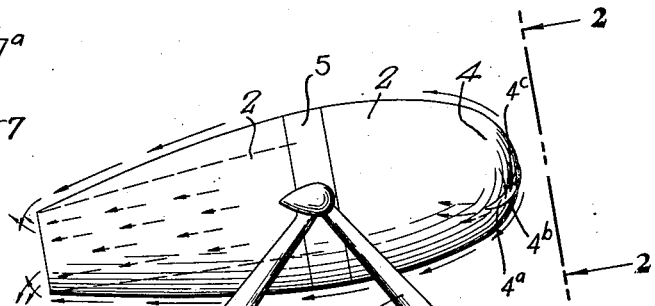
Figure 3:
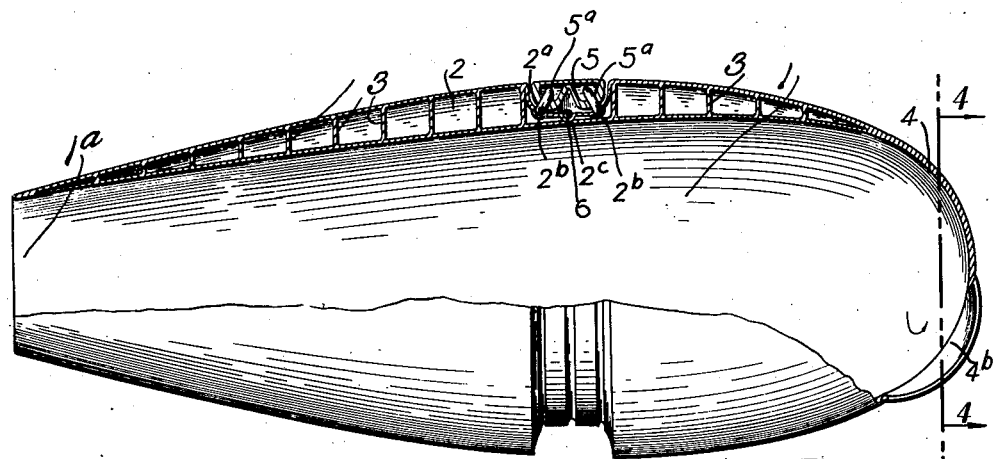
Figure 4:
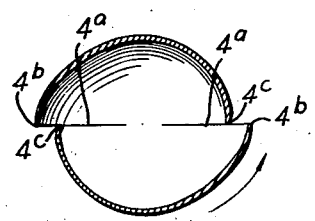

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of an aircraft with my aircraft propulsion means shown in conjunction therewith; Fig. 2 is a fragmentary, front elevational view thereof taken along the line 2—2 of Fig. 1; Fig. 3 is an enlarged sectional view through my aircraft propulsion means with parts and portions shown in elevation to facilitate the illustration; Fig. 4 is a transverse sectional view thereof through 4—4 of Fig. 3; Fig. 5 is a side elevational view of a slightly modified structure with parts and portions broken away and in section to facilitate the illustration, and Fig. 6 is a side elevational view of another modified form with parts and portions shown in elevation to facilitate the illustration.

Similar characters of reference refer to similar parts and portions throughout the several views of the drawings.

Inner shell member 1, outer shell 2, ribs 3, nose shell 4, supporting girdle 5, operating cable 6, supporting arm 7, fuselage 8, outer fins 9, and inner fins 10, constitute the principal parts and portions of my invention in its one form.

The modified structure shown in Fig. 6 comprises a shell 11, scoop 12, drive cable 13, and supporting means 14.

In the structure shown in Figs. 1 through 5, the aircraft propulsion means is relatively long and provided with a blunt forward end. An annular, tubular, inner shell member 1 is provided which is relatively large at its forward end and gradually tapers and diminishes in size towards its rear end where it ends in an opening 1a, as shown in Fig. 3.

Spaced apart intermediate its ends from this inner shell by means of a plurality of ribs 3 is an outer shell 2 which joins the inner shell at the forward end thereof and then increases in diameter to a point slightly forward of the central portion of the propulsion means. At this point the outer casing may be provided with an annular channel 2a. The remaining portion of the outer shell gradually diminishes in size until it joins the inner shell at its rear end.

A substantially semi-spherical nose shell 4 joins the inner and outer shells at the forward ends thereof and encloses the forward end of the propelling means. This forward or nose shell 4 is provided with two slits 4a which extend diametrically from the axis of the propulsion means, as indicated in Fig. 2. The one lip 4b of each slit is pressed outwardly from the surface of the propulsion means, as shown best in Figs. 1, 3 and 4. The other lip 4c of each slit is curved slightly inwardly, as also indicated in these same views, thus forming the slits into scoops which conduct air into the shell 1.

Mounted in the channel 2a of the outer shell 2 is a supporting girdle 5 having suitable rollers 5a mounted therein which ride in grooved portions 2b of the channel 2a. A third channel 2c intermediate the two channels 2b is adapted to receive a driving cable 6 which is connected with the driving mechanism of the aircraft by any suitable link arrangement, not shown. If desired, gear teeth in place of the cable 6 could be arranged so as to engage teeth of other gear, not shown, mounted in the journals 7a of the supporting arm 7. These journals 7a are adapted to permit pivotal movement of the supporting girdle 5.

In fact, any driving means which permits pivotal movement of the propulsion means about the journals 7a and which also produces the desired rotation of said propulsion means may be used, such as the driving mechanism disclosed in my Patent Number 1,743,467, dated January 14, 1930. The supporting arms 7 extend downwardly and are joined to the fuselage 8 in any suitable manner.

The curvature of the inner shell 1 is such as to gradually increase the pressure of the air passing through the propelling means with a minimum amount of disturbance. The contour of the outer shell 2 is such as to best stream line the propelling means.

If desired, the propelling means may be provided with outer fins 9 secured to the outer shell 2 and inner fins 10 secured to the inner shell in any suitable manner. It is preferred that the inner and outer fins increase in pitch from the forward to the rear ends of the propelling means so as to more effectively perform their function. It is obvious, of course, that either the inner, the outer fins, or both may be omitted, if desired.

In the structure shown in Fig. 6, the shell 11 is substantially spherical except for the scoop portions 12 formed on its forward side which are similar to the scoops formed by extending the lips 4b and depressing the lips 4c of the slits 4a. The rear side of the shell 11 is extended forming a discharge orifice 11a. The side walls 11b of the shell before forming the orifice 11a preferably curve inwardly, or in opposite direction to the normal curvature of the shell, so as to direct the air passage out in the most efficient manner. If the curvature is undesired on the outer side, a straight or convex curved outer shell 11c may connect the walls of the orifice 11a with the main body of the shell, as indicated in Fig. 6.

Small annular grooves or channels 11d are formed in the surface of the shell 11 and extend in plane at right angles to the axis of rotation of said shell. These channels 11d are spaced considerably one from the other and are adapted to receive supporting wheels 14a or other suitable supporting means 14.

Between the two channels or grooves 11d is another groove 11e which preferably encircles the shell portion 11 substantially at its center of gravity. A drive cable 13 is adapted to travel in this groove.

The operation of my aircraft propulsion means is as follows: With reference to the structure shown in Fig. 1 through 5, and particularly to Fig. 1 in which arrows indicate the air streams, the propulsion means revolves in a direction indicated by the arrows in the various views causing the scoops formed by the slits 4a to draw air into the space within the propulsion means and deliver this air out the rear thereof. The air passing inside the inner shell 1 gradually increases in velocity as it approaches the rear end of the propulsion means. The air passing over the outer shell 2 is first increased in speed and then decreased in speed towards the rear end thereof, as the air stream comes inwardly. The inner air stream, that passing through the propulsion means, has a whirling motion and when it reaches the rear end of the propulsion means it tends to fly radially. The air stream passing over the outside thereof comes in contact therewith and immediately slows down the velocity of the issuing inner air stream, creating considerable excess pressure which causes a forward movement.

It is obvious from the construction as illustrated in the drawings and described in the foregoing specification that there is provided an aircraft propulsion means as aimed at and set forth in the objects of the invention, and though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In an aircraft propulsion means, a revoluble stream line tube closed at its forward end except for slits having their one respective lips curved outwardly forming scoops.

2. In an aircraft propulsion means, a revoluble stream line tube closed at its forward end except for slits having their one respective lips curved outwardly forming scoops, said tube also having a discharge opening at its rear side for discharging the air gathered by said scoops.

3. In an aircraft propulsion means, a revoluble stream line tube, scoop means formed in its forward end for passing air into said tube.

4. In an aircraft propulsion means, a revoluble shell member having slits in its forward end, the one lip of each slit pressed outwardly from the surface of said shell forming a scoop.

5. In an aircraft propulsion means, a revoluble shell member having slits in its forward end, the one lip of each slit pressed outwardly from the surface of said shell forming a scoop, said shell open at its rear end for delivering air drawn in by said scoop.

6. In an aircraft propulsion means, a revoluble stream line tube closed at its forward end except for slits having their one respective lips curved outwardly forming scoops, said tube also having a discharge opening at its rear side for discharging the air gathered by said scoops, and helical fins formed on the outer surfaces of said tube.

7. In an aircraft propulsion means, a revoluble stream line tube closed at its forward end except for slits having their one respective lips curved outwardly forming scoops, said tube also having a discharge opening at its rear side for discharging the air gathered by said scoops, and helical fins formed on the inner surfaces of said tube.

8. In an aircraft propulsion means, a revoluble stream line tube closed at its forward end except for slits having their one respective lips curved outwardly forming scoops, said tube also having a discharge opening at its side for discharging the air gathered by said scoops, and helical fins formed on both the inner and outer surfaces of said tube.

9. In an aircraft propulsion means, a revoluble stream line tube, scoop means formed in its forward end for passing air into said tube, and helical fins formed on the surface of said tube.

10. In an aircraft propulsion means, a revoluble shell member having slits in its forward end, the one lip of each slit pressed outwardly from the surface of said shell forming a scoop, said shell open at its rear end for delivering air drawn in by said scoop, and helical fins formed on the outer surfaces of said shell member.

11. In an aircraft propulsion means, a revoluble shell member having slits in its forward end, the one lip of each slit pressed outwardly from the surface of said shell forming a scoop, said shell open at its rear end for delivering air drawn in by said scoop, and helical fins formed on the inner surfaces of said shell member.

12. In an aircraft propulsion means, a revoluble shell member having slits in its forward end, the one lip of each slit pressed outwardly from the surface of said shell forming a scoop, said shell open at its rear end for delivering air drawn in by said scoop, and helical fins formed on both the inner and outer surfaces of said shell member.

13. In an aircraft propulsion means, a revoluble stream line tube closed at its forward end except for slits having their one respective lips curved outwardly forming scoops, said tube also having a discharge opening at it side for discharging the air gathered by said scoops, and helical fins formed on both the inner and outer surfaces of said tube, said fins increasing in pitch towards the rear end of said tube.

14. In an aircraft propulsion means, a revoluble shell member having slits in its forward end, the one lip of each slit pressed outwardly from the surface of said shell forming a scoop, said shell open at its rear end for delivering air drawn in by said scoop, and helical fins formed on both the inner and outer surfaces of said shell member, said fins increasing in pitch towards the rear end of said shell member.

In testimony whereof, I have hereunto set my hand at San Diego, California this 19th day of July, 1929.

PAUL MAIWURM.